United States Patent [19]

Dumbaugh, Jr. et al.

[11] Patent Number: 5,559,060
[45] Date of Patent: Sep. 24, 1996

[54] GLASS FOR LAMINATED GLASS ARTICLES

[75] Inventors: William H. Dumbaugh, Jr., Painted Post; Suresh T. Gulati, Elmira; Robert W. Pfitzenmaier, Canisteo, all of N.Y.

[73] Assignee: Corning Incorporated, Corning, N.Y.

[21] Appl. No.: 427,317

[22] Filed: Apr. 24, 1995

Related U.S. Application Data

[62] Division of Ser. No. 886,831, May 22, 1992.

[51] Int. Cl.[6] .............................. C03C 3/091; C03C 3/087
[52] U.S. Cl. .................................. 501/66; 501/70; 501/72
[58] Field of Search .................................. 501/66, 72, 70

[56] References Cited

U.S. PATENT DOCUMENTS 3,661,601  5/1972  Dumbaugh et al. ........................ 501/59
3,673,049  6/1972  Giffen et al. .............................. 428/213
3,737,294  6/1973  Dumbaugh et al. ..................... 246/425
3,849,097  11/1974 Giffen et al. ................................ 65/33

Primary Examiner—Mark L. Bell
Assistant Examiner—Louis M. Troilo
Attorney, Agent, or Firm—Angela N. Nwaneri; Milton M. Peterson

[57] ABSTRACT

The present invention is directed to glasses exhibiting annealing points between 682°–702° C., linear coefficients of thermal expansion (25°–300° C.) between $57-59 \times 10^{-7}/°$ C., and excellent resistance to attack by HCl and $Na_2CO_3$ consisting essentially, in weight percent, of

| $SiO_2$ | 56–60 | $Na_2O$ | 0–3 |
| $Al_2O_3$ | 12–15 | $K_2O$ | 0–3 |
| $B_2O_3$ | 5.5–7 | $Na_2O + K_2O$ | 0.5–3 |
| CaO | 19–24.25 | | |

2 Claims, No Drawings

GLASS FOR LAMINATED GLASS ARTICLES

This is a division of application Ser. No. 07/886,831, filed May 22, 1992.

BACKGROUND OF THE INVENTION

Corning Incorporated, Corning, N.Y. has marketed tableware products under the trademark CORELLE® for over 20 years. The ware consists of a laminate composed of a relatively thick interior body (the core glass) enveloped within a thin surface layer (the skin glass). The ware is manufactured by means of a continuous hot forming process wherein glass batches are melted for the individual laminae and streams of the molten glasses are brought together such that laminae are essentially simultaneously fused together and shaped into a desired configuration. The individual layers are prepared from compositions exhibiting different thermal expansion and viscosity characteristics such that, upon cooling, the surface layer is placed in a state of compression and the interior body is placed in a state of tension. U.S. Pat. No. 3,673,049 (Giffen et al.) and U.S. Pat. No. 3,737,294 (Dumbaugh, Jr. et al.) provide discussions of the method of forming the laminated articles and properties exhibited by those articles. To avoid repetition here, the disclosures of those patents are expressly incorporated herein by reference.

As is explained in those patents, to secure a surface compression layer, the skin glass will have a lower linear coefficient of thermal expansion than the core glass. And, as the difference in thermal expansion (termed "expansion mismatch") is increased, the mechanical strength, as reflected in unabraded modulus of rupture measurements, the internal and maximum central tensions, the surface compression, and the stored tensile energy all increase. Furthermore, for a specific expansion mismatch the thickness of the skin glass demonstrates the following effects:

(a) the mechanical strength, as represented by unabraded modulus of rupture measurements, decreases essentially linearly with increasing skin thickness;

(b) both the internal tension and the maximum central tension increase essentially linearly with increasing skin thickness;

(c) the depth of the compression layer decreases approximately linearly with increasing skin thickness following air tempering;

(d) the stored tensile energy in the core glass, which factor directly impacts upon product frangibility, increases quadratically with increasing skin thickness; and (e) the surface compression decreases essentially linearly with increasing skin thickness.

The overall thickness of CORELLE® ware is closely controlled which, in turn, restricts the individual thicknesses of the core and skin glasses. Whereas the tableware is very strong mechanically, the thinness of the glassware subjects it to infrequent breakage. As can be appreciated, it is most desirable that any such breakage be relatively gentle so that the likelihood of injury to the user is reduced to a minimum. Paragraph (d) above notes that the stored tensile energy in the core glass is the prime factor in influencing the force of breakage and that energy increases significantly with increasing skin thickness.

Because the skin glass of CORELLE® ware is very thin, the articles can be subject to delayed breakage; i.e., in usage the ware may become bruised, scuffed, chipped, or otherwise injured, but the impact causing the injury is not sufficient to cause immediate breakage. In further service, however, other small impacts and/or the penetration of water may cause the initial injury to move through the skin to the interface between the skin and core glasses, thereby resulting in breakage. A thicker skin layer would reduce the possibility of such breakage.

Thus, the skin glass must be sufficiently thick to assure complete coverage of the ware surface to provide a compression layer thereon to enhance the mechanical strength of the ware, but not so thick that the central tension and stored tensile energy in the core glass become very high. Accordingly, a balance must be struck between the thickness of the surface skin and the difference in thermal expansion existing between the core glass and the skin glass.

The overall thickness of CORELLE® ware is ~0.105" (~2.7 mm) with a skin thickness of about 0.0015"–0.003" (~0.04–0.08 mm). Spontaneous opal glasses having compositions disclosed in U.S. Pat. No. 3,661,601 (Dumbaugh et al.) have been found to be particularly suitable for use as core or body glasses in laminated glass articles. Those glasses exhibit linear coefficients of thermal expansion (0°–300° C.) of about $60$–$110 \times 10^{-7}$/° C. and consist essentially, expressed in terms of weight percent on the oxide basis, of

| | | | |
|---|---|---|---|
| $SiO_2$ | 50–75 | $Na_2O$ | 0–7 |
| $Al_2O_3$ | 3–9 | $K_2O$ | 0–7 |
| CaO | 11–20 | $N_2O + K_2O$ | 3–10 |
| $B_2O_3$ | 1–7 | F | 2–4 | the sum of those components constituting at least 85% of the total composition.

The opacity present in those glasses results from a non-crystalline opacifying phase consisting of phase separated droplets or opacifying particles which comprise about 10–40% by volume of the total glass volume. The core glass used in CORELLE® ware, viz., Corning Code 1001, has the following approximate composition, expressed in terms of weight percent

| | | | |
|---|---|---|---|
| $SiO_2$ | 64.4 | $Na_2O$ | 3.05 |
| $Al_2O_3$ | 6.2 | $K_2O$ | 3.0 |
| CaO | 15.0 | MgO | 1.07 |
| $B_2O_3$ | 4.75 | F | 3.4 | and exhibits an annealing point of 605° C., a strain point of 557° C., and a linear coefficient of thermal expansion (0°–300° C.) of $72 \times 10^{-7}$/° C. The phase separated droplets crystallize during subsequent thermal tempering of the CORELLE® ware. Compositions found to be especially suitable for preparing transparent skin glasses exhibit linear coefficients of thermal expansion (0°–300° C.) of about $30$–$80 \times 10^{-7}$/° C. and consist essentially, expressed in terms of weight percent on the oxide basis, of

| | | | |
|---|---|---|---|
| $SiO_2$ | 50–65 | MgO | 0–12 |
| $Al_2O_3$ | 10–20 | $B_2O_3$ | 0–10 |
| CaO | 5–25 | | | with, optionally, up to 12% total of at least one oxide selected from the group of BaO, $La_2O_3$, SrO, and ZnO, and up to 5% total of at least one oxide selected from the group of $K_2O$, $Li_2O$, $Na_2O$, $TiO_2$ and $ZrO_2$.

The skin glass used in CORELLE® ware, viz., Corning Code 1002, has the following approximate composition, expressed in terms of weight percent,

| SiO$_2$ | 58.25 | B$_2$O$_3$ | 6.25 |
| Al$_2$O$_3$ | 14.8 | MgO | 5.7 |
| CaO | 15.0 | | | and demonstrates a linear coefficient of thermal expansion (0°–300° C.) of 48×10$^{-7}$/° C.

The mismatch in thermal expansion existing between the body and skin glasses is directly related to both the strength of the laminate and the frangibility. The term mismatch refers to the difference in thermal expansion between the skin and body glasses, the measurement being computed at the setting temperature of the softer (lower annealing point) body glass and expressed in terms of parts per million (ppm). It can be appreciated that, once defined, this mismatch, for all practical purposes, is not a controllable variable in the manufacturing process; hence, the criticality of selecting the core and skin glass compositions to achieve the desired mismatch.

As was observed above, the overall thickness of CORELLE® tableware is held within straitly-limited values. Accordingly, an increase in thickness of the skin glass requires a compensating decrease in the cross-section of the body glass. As was also explained above, however, an increase in thickness of the skin glass, when the expansion mismatch is held constant, results in a buildup of the central tension in the core glass which leads to more forceful breakage. Therefore, in order to safely increase the thickness of the skin to enhance resistance to bruises and scratches, the level of expansion mismatch must be reduced. Nevertheless, in achieving that goal, the other chemical and physical properties required in the individual core and skin glasses, as well as those displayed by the laminate, must not be sacrificed. For example, the annealing point, the liquidus temperature, the liquidus viscosity, and the chemical durability must closely track present values. Moreover, the mechanical strength of the laminate must not be degraded to any substantial extent.

The linear coefficient of thermal expansion (0°–300° C.) of Corning Code 1001 glass is 72×10$^{-7}$/° C. and that of Corning Code 1002 is 48×10$^{-7}$/° C., resulting in a mismatch of 1733 ppm. It was calculated that an expansion mismatch of about 1200–1400 ppm would not significantly degrade the mechanical strength of the laminate but would permit an increase in skin glass thickness, thereby leading to both improved breakage characteristics and improved resistance to bruises and scratches. Moreover, the use of a thicker skin layer enables the production of deeper drawn ware inasmuch as hazards resulting from the skin becoming too thin at the bottom corners and edges of the ware during vacuum forming are greatly reduced. With continued use of Corning Code 1001 as the body glass, a new skin glass was sought exhibiting a linear coefficient of thermal expansion of 57–59×10$^{-7}$/° C. which would result in an expansion mismatch approximating 1200–1400 ppm.

Accordingly, the primary objective of the instant invention was to devise glass compositions demonstrating linear coefficients of thermal expansion within the interval of about 57–59×10$^{-7}$/° C. and which display chemical and physical properties closely compatible with those exhibited by Code 1001 glass, while maintaining the viscosity characteristics of the current skin glass. Thus, the approximately 30% reduction in expansion mismatch between the body and skin glasses would lead to (a) about 20% lower central tension in the body glass, (b) about 37% lower stored energy in the body glass, with consequent less breakage force, (c) the capability of increasing the thickness of the skin glass to about 0.0045" (~0.1 mm), and (d) a compression layer about 13–22% deeper, with consequent 13–22% improvement in resistance to bruises and scratches.

SUMMARY OF THE INVENTION

That objective can be achieved utilizing glasses consisting essentially, expressed in terms of weight percent on the oxide basis, of

| SiO$_2$ | 56–60 | CaO | 19–24.25 |
| Al$_2$O$_3$ | 12–15 | Na$_2$O | 0–3 |
| B$_2$O$_3$ | 5.5–7 | K$_2$O | 0–3 |
| | Na$_2$O + K$_2$O 0.5–3. | | |

Those glasses demonstrate annealing points of 682°–702° C., linear coefficients of thermal expansion of 57–59×10$^{-7}$/° C., internal liquidus values of ≦1100° C., solubilities in 5% by weight aqueous solutions of HCl at 95° C. for 24 hours of ≦1 mg/cm$^2$, and solubilities in 0.02N aqueous solutions of Na$_2$CO$_3$ at 95° C. for 6 hours of ≦0.25 mg/cm$^2$.

The preferred compositions consist essentially, in weight percent, of

| SiO$_2$ | 57–59 | CaO | 20–22 |
| Al$_2$O$_3$ | 13–15 | Na$_2$O | 0–1.5 |
| B$_2$O$_3$ | 5.5–7 | K$_2$O | 0–1.5 |
| | Na$_2$O + K$_2$O 0.5–1.5. | | |

PRIOR ART

The composition intervals for the calcium alumino-silicate skin glasses disclosed in U.S. Pat. Nos. 3,673,049 and 3,737,294 (supra) overlap the ranges of the instant inventive glasses, but there is no discussion in either patent of glasses exhibiting the chemical, physical, and viscosity characteristics demanded in the subject glasses, and none of the working examples provided in those patents has a composition coming within the ranges of the present glasses.

DESCRIPTION OF PREFERRED EMBODIMENTS

Table I records a group of glass compositions, expressed in terms of parts by weight on the oxide basis, illustrating the criticality of composition control to yield glasses demonstrating the required properties. Because the sum of the components totals or closely approximates 100, for all practical purposes the tabulated value of the individual components can be deemed to represent weight percent. The actual batch ingredients can comprise any materials, either an oxide or another compound, which, when melted together with the other constituents, will be converted into the desired oxide in the proper proportions. For example, CaCO$_3$ and Na$_2$CO$_3$ can comprise the source of CaO and Na$_2$O, respectively. Example 13 comprises Corning Code 1002 glass.

The batch components were compounded, ball-milled together to assist in obtaining homogeneous melt, and charged into platinum crucibles. The crucibles were moved into a furnace operating at about 1550° C. and the batches melted for four hours. The melts were poured onto a steel plate to yield glass slabs having the approximate dimensions of 12"×5"×0.375" (~30.5×12.7×1 cm), and those slabs were transferred immediately to an annealer operating at about 690°–710° C.

It will be appreciated that the above description of mixing, melting, and forming procedures represents laboratory activity only and that the glass compositions operable in the present invention are capable of being produced employing mixing, melting, and forming practices conventionally employed in commercial glassmaking. That is, it is only necessary that the batch ingredients be thoroughly blended together, melted for a sufficient length of time at a high enough temperature to secure a homogeneous melt, and thereafter formed into a glass article. In most instances the glass article will be subjected to an annealing process. When the batch is melted commercially, the melt may be sulfate fined.

TABLE II

|      | 1     | 2     | 3     | 4     | 5     | 6    | 7    | 8    | 9     | 10    | 11    | 12    | 13    |
|------|-------|-------|-------|-------|-------|------|------|------|-------|-------|-------|-------|-------|
| Exp. | 58.2  | 58.1  | 56.3  | 57.8  | 57.5  | 59.3 | 58.6 | 59.2 | 55.6  | 54.4  | 55.0  | 55.8  | 48.8  |
| S.P. | 861   | 853   | 861   | —     | —     | —    | —    | 876  | —     | —     | —     | —     | 872   |
| A.P. | 685   | 678   | 686   | 686   | 697   | 691  | 685  | 678  | 707   | 697   | 696   | 702   | 692   |
| St.P.| 641   | 636   | 642   | 644   | 654   | 646  | 644  | 637  | 667   | 649   | 661   | 660   | 649   |
| Den. | 2.593 | 2.577 | 2.575 | 2.593 | 2.592 | —    | —    | —    | 2.605 | —     | —     | 2.618 | 2.566 |
| Liq. | 1040  | 1015  | 1055  | 1040  | 1070  | 1072 | 1045 | 1019 | 1073  | 1088  | 1025  | 1045  | 962   |
| W.L.A.| 0.59 | 0.8   | 0.6   | 0.9   | 1.9   | 0.9  | 4.7  | 4.9  | 0.7   | 1.2   | 5.3   | 2.1   | 0.8   |
| W.L.B.| 0.02 | 0.08  | 0.09  | 0.09  | 0.09  | —    | —    | —    | 0.06  | —     | —     | 0.17  | 0.17  |

TABLE I

|         | 1    | 2    | 3    | 4    | 5    | 6    | 7    |
|---------|------|------|------|------|------|------|------|
| $SiO_2$ | 57.9 | 57.9 | 58.1 | 57.0 | 56.6 | 56.1 | 54.4 |
| $Al_2O_3$ | 13.8 | 14.8 | 14.9 | 13.9 | 13.9 | 12.8 | 12.9 |
| $B_2O_3$ | 6.1 | 5.69 | 5.72 | 6.35 | 6.31 | 6.25 | 7.57 |
| CaO     | 21.1 | 20.4 | 19.4 | 21.5 | 21.3 | 24.2 | 24.4 |
| $Na_2O$ | 1.1  | 1.13 | 1.7  | 1.13 | —    | —    | —    |
| $K_2O$  | —    | —    | —    | —    | 1.71 | —    | —    |

|         | 8    | 9    | 10   | 11   | 12   | 13    |
|---------|------|------|------|------|------|-------|
| $SiO_2$ | 52.7 | 57.3 | 56.3 | 54.6 | 56.4 | 58.25 |
| $Al_2O_3$ | 13.1 | 14.7 | 14.7 | 14.8 | 13.8 | 14.8 |
| $B_2O_3$ | 8.91 | 5.64 | 6.27 | 7.59 | 6.29 | 6.25  |
| CaO     | 24.6 | 22.2 | 22.2 | 22.4 | 23.3 | 15.0  |
| MgO     | —    | —    | —    | —    | —    | 5.7   |

Table II reports the linear coefficient of thermal expansion (Exp.) over the temperature range of 25°–300° C. expressed in terms of $\times 10^{-7}/°$ C., the softening point (S.P.), annealing point (A.P.), and strain point (St.P.) expressed in terms of ° C., and the density (Den.) expressed in terms of grams/cm³ as determined in accordance with measuring techniques conventional in the glass art.

The liquidus temperature (Liq.) was established by placing crushed glass in a platinum boat, inserting the filled boat into a furnace having a temperature gradient which spans the conjectured liquidus temperature, maintaining the boat within that furnace for 24 hours, and then withdrawing the boat into the ambient environment. The length of glass was extracted from the boat, thin sections were cut therefrom which were ground thin and polished, and those thinned and polished sections were examined microscopically for the presence of crystals, the temperature in ° C. at the crystal/glass interface being adjudged to be the liquidus temperature.

The chemical durability of the glasses when exposed to acids, as defined in terms of weight loss (W.L.A.), was determined by immersing polished plates of known weight for 24 hours in an aqueous bath of 5% by weight HCl operating at 95° C. After withdrawal from the bath and drying, the plates are reweighed and the weight loss measured in terms of mg/cm².

The chemical durability of the glass when exposed to bases, as defined in terms of weight loss (W.L.B.), was determined by immersing polished plates of known weight for 6 hours in an aqueous bath of 0.02N $Na_2CO_3$ operating at 95° C. After withdrawal from the bath and drying, the plates are reweighed and the weight loss measured in terms of mg/cm².

That strict control of the concentrations of the individual components to produce glasses demonstrating the demanded matrix of properties is evident from an examination of Tables I and II. For example, at levels of $B_2O_3$ greater than 7%, the chemical durability of the glass becomes unacceptable. At levels below 5.5% the glass can become too hard as is illustrated in the annealing point of 707° C. in Example 9.

The incorporation of $Na_2O$ and/or $K_2O$ raises the thermal expansion of the glass but also can adversely affect the acid durability thereof and lower the annealing point. Therefore, the total alkali metal oxide content will not exceed about 3%, with the preferred glasses containing no more than about 1.5%. $K_2O$ appears to have less effect upon the annealing point than $Na_2O$, but a greater adverse effect upon acid durability.

$Al_2O_3$ is present at a level of 12% to impart good chemical durability to the glass. Nevertheless, $Al_2O_3$ contents in excess of about 15% may lead to crystallization during the forming process.

Example 1 constitutes the most preferred embodiment of the inventive glasses. Its viscosity characteristics closely track those of Corning Code 1002 glass and its chemical durability is somewhat superior thereto. Its mismatch with Corning Code 1001 glass is 1257 ppm.

We claim:

1. A glass demonstrating an annealing point between 682°–702° C., a linear coefficient of thermal expansion (25°–300° C.) between 57–59×$10^{-7}$/° C., a weight loss after immersion for 24 hours at 95° C. in an aqueous 5% by weight HCl solution of no more than 1 mg/cm², and a weight loss after immersion for 6 hours at 95° C. in an aqueous 0.02N $Na_2CO_3$ solution of no more than 0.25 mg/cm², said glass consisting essentially, expressed in terms of weight percent on the oxide basis, of

| $SiO_2$ | 56–60 | $Na_2O$ | 0–3 |
| $Al_2O_3$ | 12–15 | $K_2O$ | 0–3 |
| $B_2O_3$ | 5.5–7 | $Na_2O + K_2O$ | 0.5–3. |
| CaO | 19–24.25 | | |

2. A glass according to claim 1 consisting essentially of

| $SiO_2$ | 57–59 | $Na_2O$ | 0–1.5 |
| $Al_2O_3$ | 13–15 | $K_2O$ | 0–1.5 |
| $B_2O_3$ | 5.5–7 | $Na_2O + K_2O$ | 0.5–1.5. |
| CaO | 20–22 | | |

* * * * *